United States Patent [19]

Shindo et al.

[11] Patent Number: 4,802,744
[45] Date of Patent: Feb. 7, 1989

[54] OPTICAL MODULATION APPARATUS

[75] Inventors: Hitoshi Shindo, Atsugi; Masahiko Enari, Yokohama; Mitsutoshi Kuno, Tokyo, all of Japan

[73] Assignee: Canon Kabushiki Kaisha, Tokyo, Japan

[21] Appl. No.: 36,873

[22] Filed: Apr. 10, 1987

[30] Foreign Application Priority Data

Apr. 11, 1986 [JP] Japan .................................. 61-83926
May 26, 1986 [JP] Japan ................................. 61-119194
Jun. 20, 1986 [JP] Japan ................................. 61-145614

[51] Int. Cl.$^4$ ............................................. G02F 1/13
[52] U.S. Cl. ............................... 350/339 F; 350/336; 350/350 S
[58] Field of Search ................. 350/339 F, 336, 350 S

[56] References Cited

U.S. PATENT DOCUMENTS 4,367,924 1/1983 Clark et al. ..................... 350/350 S
4,579,424 4/1986 Matsukawa et al. ............ 350/339 F
4,641,923 2/1987 Bohmer et al. ....................... 350/336

Primary Examiner—Stanley D. Miller
Assistant Examiner—Trong Quang Phan
Attorney, Agent, or Firm—Fitzpatrick, Cella, Harper & Scinto

[57] ABSTRACT

An optical modulation device includes: a first substrate having thereon a high-resistivity film having a sheet resistivity of $10^3$ Ω/□ or above and a plurality of scanning electrode lines having a sheet resistivity of $10^2$ Ω/□ or below and electrically connected to the high-resistivity film; a second substrate having thereon a plurality of data electrodes; and an optical modulation material disposed between the first and second substrates. At least one of the first and second substrates has thereon a pair of color filters of the same color disposed on both sides of at least one of the scanning electrode lines. The difference in height betwen the high-resistivity film and the scanning electrode lines is less than 1000 Å.

38 Claims, 8 Drawing Sheets

OPTICAL MODULATION APPARATUS

FIELD OF THE INVENTION AND RELATED ART

The present invention relates to an optical modulation device for use in a display panel, particularly an optical modulation device adapted to gradational or tonal display using a liquid crystal material, especially, a ferroelectric liquid crystal.

In the conventional liquid crystal television panel of the active matrix driving system, thin film transistors (TFTs) are arranged in a matrix corresponding to respective pixels. When a gate-on pulse is applied to a TFT to turn on the source-drain channel, a picture image signal is applied to the source and stored in a capacitor. A liquid crystal (e.g., TN (twisted nematic) liquid crystal) is driven by the stored image signal and a gradational display is effected by voltage modulation of pixels.

However, such a television display panel of the active matrix driving system using a TN liquid crystal uses a complicated structure of TFTs requiring a large number of production steps and is accompanied by the disadvantage of high production costs. Moreover, there is the further problem that it is difficult to provide a large area of semiconductor film (e.g., of polysilicon, amorphous silicon) constituting TFTs.

On the other hand, a display panel of a passive matrix driving type using a TN liquid crystal has been known as one of a low production cost. However, in this type of liquid crystal display panel, when the number (N) of scanning lines is increased, the time period (duty factor) during which one selected point is subjected to an effective electric field during the time when one frame is scanned is decreased at a ratio of 1/N, whereby crosstalk occurs and a picture with a high contrast cannot be obtained. Furthermore, as the duty factor is decreased, it is difficult to control gradation of respective pixels by means of voltage modulation so that this type of display is not adapted for a display panel of a high pixel or wiring density, particularly one for a liquid crystal television panel.

SUMMARY OF THE INVENTION

A principal object of the present invention is to solve the above mentioned problems.

A more specific object of the present invention is to provide an optical modulation device for a display panel of a high pixel density over a wide area, particularly one suitable for a gradational display.

Another object of the present invention is to provide a display device for color gradational display using a ferroelectric liquid crystal.

According to a first aspect of the present invention, there is provided an optical modulation device, comprising: a first substrate having thereon a first conductor film, a second substrate having thereon a second conductor film, and an optical modulation material disposed between the first and second substrates; at least one of the first and second conductor films having a low-resistivity portion and a high-resistivity portion, the difference in film thickness between the low-resistivity portion and the high-resistivity portion being 1000 Å or less.

According to a second aspect of the present invention, there is provided an optical modulation device, comprising: a first substrate having thereon a first conductor film, a second substrate having thereon a second conductor film, and an optical modulation material disposed between the first and second substrates; at least one of the first and second conductor films having thereon a plurality of low-resistivity transmission electrode lines electrically connected thereto; at least one of the first and second substrates having a color filter disposed on both sides of at least one of the transmission electrode lines.

According to a further aspect of the present invention, there is provided an optical modulation device adapted to a gradational display system, wherein a potential gradient is formed in a pixel, and a pulse signal having a peak value, a pulse duration or a number of pulses depending on given gradation data is applied to respective pixels, to thereby form regions of varying ratios respectively exceeding and not exceeding an inversion threshold voltage in each pixel so as to provide a corresponding gradation.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

As an optical modulation material used in the present invention, that is a material exhibiting a first optically stable state (e.g., assumed to form a "bright" state) and a second optically stable state (e.g., assumed to form a "dark" state) depending on an electric field applied thereto, i.e., one showing at least two stable states in response to an electric field, particularly a liquid crystal having such a property, may be used.

Preferable ferroelectric liquid crystals exhibiting at least two stable states which can be used in the present invention are chiral smectic liquid crystals having ferroelectricity, among which liquid crystals having chiral smectic C phase (SmC*), H phase (SmH*), I phase (SmI*), F phase (SmF*) or G phase (SmG*) are suitable. These ferroelectric liquid crystals are described in, e.g., "LE JOURNAL DE PHYSIQUE LETTRES"36 (L-69), 1975 "Ferroelectric Liquid Crystals": "Applied Physics Letters" 36 (11) 1980, "Submicro Second Bistable Electrooptic Switching in Liquid Crystals", "Kotai Butsuri (Solid State Physics)" 16 (141), 1981 "Liquid Crystal", etc. Ferroelectric liquid crystals disclosed in these publications may be used in the present invention.

More particularly, examples of ferroelectric liquid crystal compounds usable in the method according to the present invention include decyloxybenzylidene-p'-amino-2-methylbutyl cinnamate (DOBAMBC), hexyloxy- benzylidene-p'-amino-2-chloropropyl cinnamate (HOBACPC), 4-O-(2-methyl)-butylresorcylidene-4'-octylaniline (MBRA8), etc.

When a device is constituted using these materials, the device may be supported with a block of copper, etc., in which a heater is embedded in order to realize a temperature condition where the liquid crystal compounds assume an SmC*, SmH*, SmI*, SmF* or SmG* phase.

Figure 1:
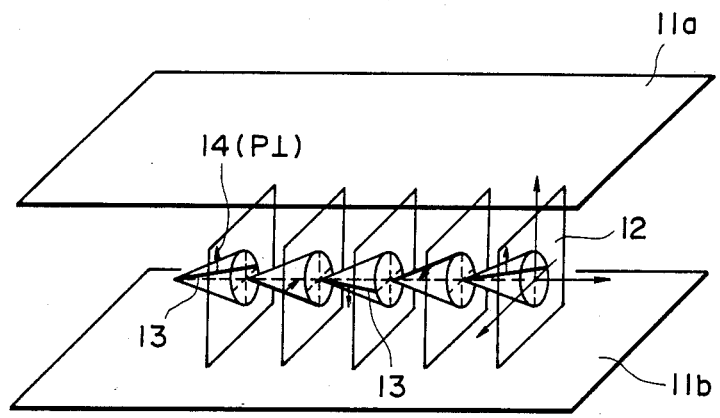
FIGS. 1 and 2 are schematic perspective views each illustrating the operation principle of a ferroelectric liquid crystal device used in the present invention.
Figure 2:
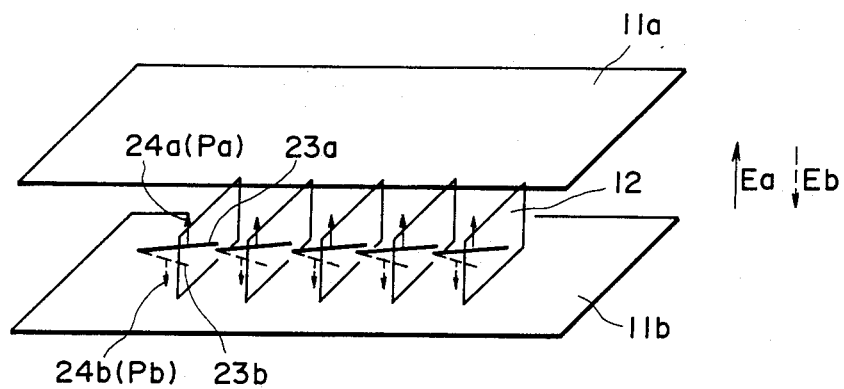

Referring to FIG. 1, there is schematically shown an example of a ferroelectric liquid crystal cell for explanation of the operation thereof. Reference numerals 11a and 11b denote base plates (glass plates) on which a transparent electrode of, e.g., In$_2$O$_3$, SnO$_2$, ITO (Indium-Tin-Oxide), etc., is disposed, respectively. A liquid crystal of, e.g., an SmC*-phase in which liquid crystal molecular layers 12 are oriented perpendicular to surfaces of the glass plates is hermetically disposed therebetween. Solid lines 13 show liquid crystal molecules. Each liquid crystal molecule 13 has a dipole moment (P⊥) 14 in a direction perpendicular to the axis thereof. When a voltage higher than a certain threshold level is applied between electrodes formed on the base plates 11a and 11b, the helical structure of the liquid crystal molecule 13 is unwound or released to change the alignment direction of respective liquid crystal molecules 13 so that the dipole moments (P⊥) 14 are all directed in the direction of the electric field. The liquid crystal molecules 13 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device, whose optical characteristics vary depending upon the polarity of an applied voltage. Further, when the thickness of the liquid crystal cell is sufficiently thin (e.g., 1 μ), the helical structure of the liquid crystal molecules is unwound even in the absence of an electric field whereby the dipole moment assumes either of the two states, i.e., Pa in an upper direction 23a or Pb in a lower direction 24a as shown in FIG. 2. When electric field Ea or Eb higher than a certain threshold level and different from each other in polarity as shown in FIG. 2 is applied to a cell having the above-mentioned characteristics, the dipole moment is directed either in the upper direction 24a or in the lower direction 24b depending on the vector of the electric field Ea or Eb. In correspondence with this, the liquid crystal molecules are oriented in either of a first stable state 23a (bright state) and a second stable state 23b (dark state).

When the above-mentioned ferroelectric liquid crystal is used as an optical modulation element, it is possible to obtain two advantages. First is that the response speed is quite fast. Second is that the orientation of the liquid crystal shows bistability. The second advantage will be further explained, e.g., with reference to FIG. 2. When the electric field Ea is applied to the liquid crystal molecules, they are oriented in the first stable state 23a. This state is stably retained even if the electric field is removed. On the other hand, when the electric field Eb whose direction is opposite to that of the electric field Ea, is applied thereto, the liquid crystal molecules are oriented to the second stable state 23b, whereby the directions of molecules are changed. This state is also stably retained even if the electric field is removed. Further, as long as the magnitude of the electric field Ea or Eb being applied is not above a certain threshold value, the liquid crystal molecules are placed in the respective orientation states. In order to effectively realize high response speed and bistability, it is preferable that the thickness of the cell is as thin as possible and generally 0.5 to 20 μm particularly 1 to 5 μm. A liquid crystal-electrooptical device having a matrix electrode structure in which the ferroelectric liquid crystal of this kind is used is proposed, e.g., in the specification of U.S. Pat. No. 4,367,924 by Clark and Lagerwall.

Hereinbelow, an embodiment of the display device used in the present invention will be explained with reference to FIG. 3.

Figure 3:
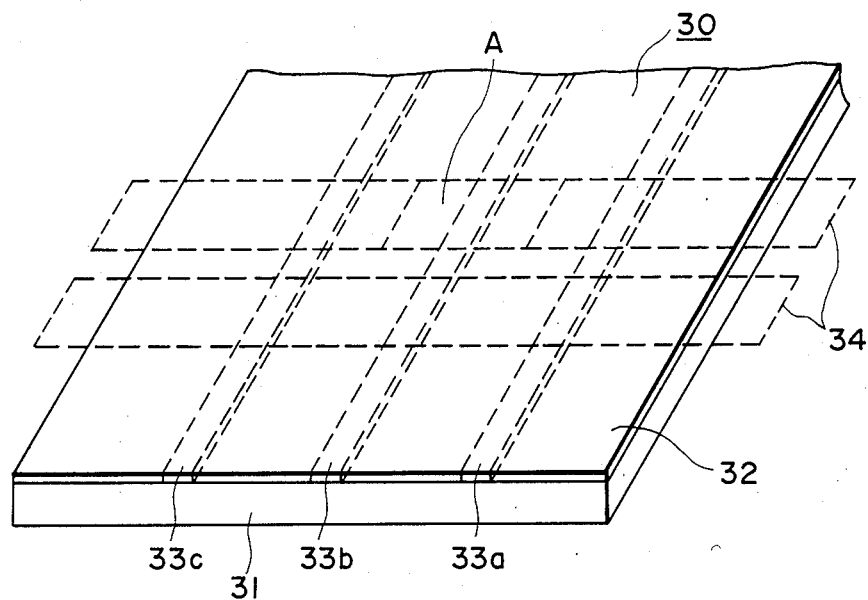
FIG. 3 is a partial perspective view of one substrate used in the present invention.

Referring to FIG. 3, a glass substrate 31 has thereon a display conductor film 30 constituting stripe-form high resistivity portions 32, and transmission electrodes 33 disposed in the conductor film 30 in parallel with each other at equal spacings and constituting low resistivity portions. The display conductor film 30 has a region A defining a pixel. Facing the display conductor film 30, a counter conductor film (counter electrode) is disposed on the other substrate (not shown) at a region on the other substrate corresponding to the above mentioned region A. An optical modulation material as described above is sandwiched between the display conductor film 30 and the counter electrode film 34.

In a preferred embodiment, a 1000 Å-thick conductor film 30 was formed on a glass substrate 31 by EB (electron-beam) vapor deposition of In$_2$O$_3$ containing 10 wt. % of ZnO$_2$. The conductor film had a sheet resistivity of 100 KΩ/□. Then, Sn was vapor deposited in a thickness of 100 Å and then patterned into stripes. Then, the substrate was heated at 1000° C. for 30 minutes in an oxygen atmosphere to cause thermal diffusion of the Sn. Thereafter, the excessive Sn or its oxide was removed by etching to leave low-resistivity portions 33 of 20 μm in width at a spacing of 230 μm. At this time, the low-resistivity portion (transmission electrodes) 33 provided a sheet resistivity of 20 Ω/□ and the high-resistivity portions 32 retained a resistivity corresponding to a sheet resistivity of 100 KΩ/□. Similar high-resistivity portions 32 and low-resistivity portions 33 were formed on the counter substrate in the same manner.

A pair of the prepared substrates were respectively coated with an about 500 Å-thick polyvinyl alcohol layer and subjected to rubbing.

The two substrates were disposed to face each other with a gap of about 1 μ and secured to each other to form a blank cell, into which a ferroelectric liquid crystal composition comprising predominantly a mixture of p-n-octyloxybenzoic acid-p'-(2-methylbutyloxy)phenyl-ester and p-n-nonyloxybenzoic acid-p'-(2-methylbutyloxy)phenyl-ester was injected and sealed.

According to the above method, it is possible to form a flat conductor film having substantially no difference in film thickness between the high-resistivity portions 32 and the low-resistivity portions 33, but in general, the difference in film thickness may generally be set to 1000 Å or less, preferably 800 Å or less, and more specifically preferably 500 Å or less. If the above thickness difference exceeds 1000 Å, an alignment defect results in a domain of a ferroelectric liquid crystal, particularly a chiral smectic liquid crystal, and in such a domain involving an alignment defect, a normal driving for switching cannot be effected.

As will be described hereinbelow, an optical modulation device having a high-resistivity portion and a low-resistivity portion for each pixel is adapted to a gradational display. A characteristic feature of the optical modulation device according to the present invention is that the difference in film thickness is set to 1000 Å or less whereby a ferroelectric liquid crystal in a cell is aligned without an alignment defect in a pixel.

In another embodiment of the present invention, it is possible to first form a uniform ITO film as a conductor film 30 on a substrate 31 by vapor deposition and then to form high resistivity portions by selective diffusion of Zn. At this time, the conductor film portions free of diffused Zn may be used as low-resistivity portions 33.

The sheet resistivity of the low-resistivity portions is set to $10^2 \, \Omega/\square$ or below and the sheet resistivity of the high resistivity portions is set to $10^3 \, \Omega/\square$-1 $M\Omega/\square$. The sheet resistivities are based on measured values according to ASTM-D257.

Figure 4A:
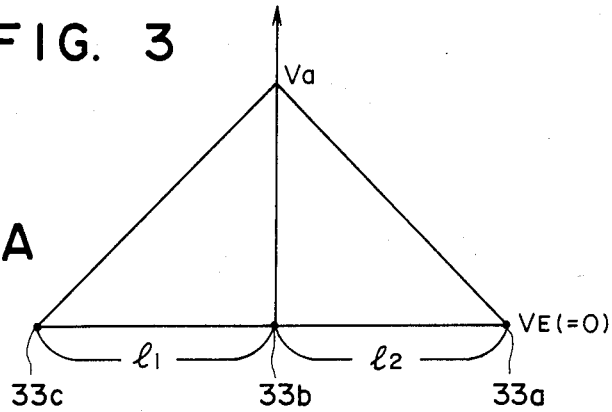
FIGS. 4A and 4B are explanatory views showing potential gradients used in the present invention.
Figure 4B:
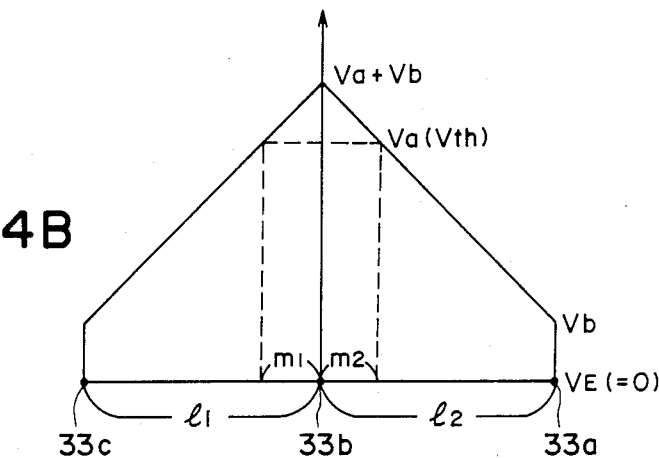

In the liquid crystal optical device as constituted above, a signal voltage is applied to a low-resistivity portion used as a transmission electrode 33 to provide a potential gradient along the extension of a high-resistivity portion used as a display conductor film 32, whereby a gradient in potential difference is produced in the electric field between the conductor film 32 and the counter electrode 34. In this instance, when the transmission electrodes 33a and 33c are connected to a reference potential $V_E$ (e.g., 0 volt), and a prescribed signal voltage Va is applied to a transmission electrode 33b, a voltage difference or slope of Va is developed in a length $l_1$ between the transmission electrodes 33a and 33b and between the electrodes 33b and 33c, respectively, of the extension of the conductor film 32 as shown in FIG. 4A. At this time, when the counter electrode 34 is supplied with a voltage of $-Vb$ having such a magnitude that $Va+Vb>Vth$ (inversion threshold voltage of the ferroelectric liquid crystal used), the portion or region of the liquid crystal contacting the lengths $m_1$ and $m_2$ of the conductor film 32 is supplied with a voltage (at the maximum of $Va+Vb$) exceeding the inversion threshold voltage Vth to be inverted, e.g., from the bright state to the dark state as shown in FIG. 4B. As a result, according to the present invention, a gradation is displayed at each pixel by applying various Vb according to given gradation data for the respective pixels. In this instance, the voltage signal of $-Vb$ can be modulated depending on given gradation data with respect to the voltage value (peak value), with respect to the pulse duration, or with respect to the number of pulses to control the resultant gradation.

In the present invention, prior to the application of the above mentioned gradation signal, a pixel concerned is subjected to an erasure step by being brought to either one of the bright and dark states, and then an inversion voltage for inverting the state is applied to the ferroelectric liquid crystal while being controlled depending on given gradation data.

Figure 5:
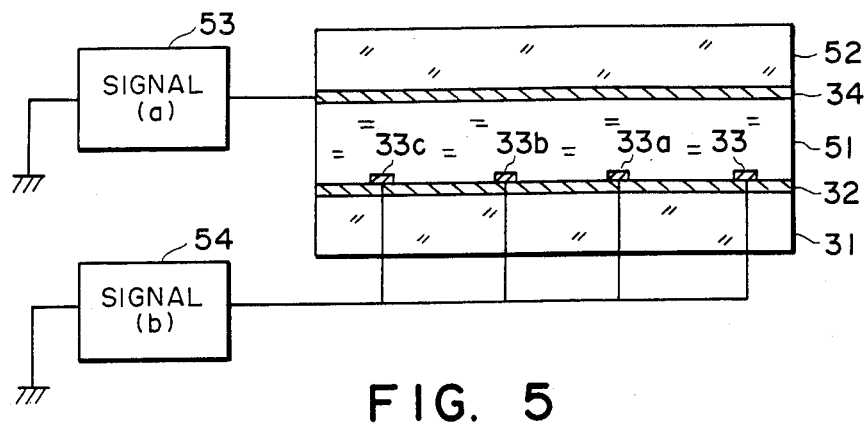
FIG. 5 is a schematic sectional view of an optical modulation device according to the present invention.
Figure 6:
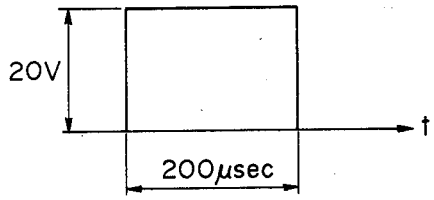
FIG. 6 shows an example of scanning signal.
Figure 7A:
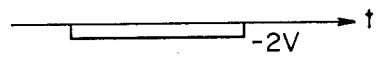
FIGS. 7A–7E show examples of gradation signals used in the present invention.
Figure 7B:
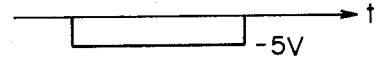
Figure 7C:
Figure 7D:
Figure 7E:
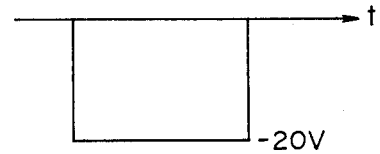

FIG. 5 schematically illustrates a method of applying electric signals to a liquid crystal cell which includes a counter electrode 34, a counter substrate 52, and a liquid crystal layer 51, a ferroelectric liquid crystal, preferably a chiral smectic liquid crystal operating under a bistability condition, disposed between the counter substrate and the substrate 31 shown in FIG. 3, and FIGS. 6 and 7A–7E show examples of electric signals applied thereto. FIG. 6 shows a waveform of SIGNAL(a) generated by a driver circuit 53 in FIG. 5 and FIGS. 7A–7E show waveforms of SIGNAL(b) generated by a driver circuit 54 in FIG. 5.

Now, a pulse of $-12V$, 200 $\mu$sec as SIGNAL(a) and a pulse of 8V, 200 $\mu$sec as SIGNAL(b) are applied in phase with each other in advance in an erasure step. These pulses are referred to as erasure pulses. Then, the liquid crystal is switched or brought to the first stable state, to thereby render the whole pixel A "bright" as the polarizers are arranged in that manner. At this state, various pulses as shown in FIGS. 7A–7E are applied respectively in phase with the pulse shown in FIG. 6 applied from the driver circuit 53, whereby the pixel A provides optical states as shown in FIGS. 8A–8D.

Figure 8A:
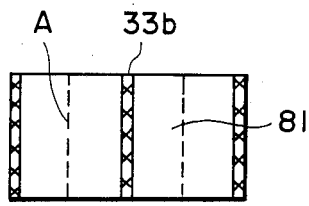
FIGS. 8A–8D show schematic views showing bright-to-dark gradational states of a pixel obtained correspondingly.
Figure 8B:
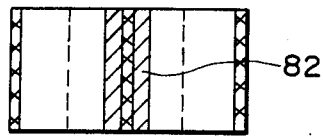
Figure 8C:
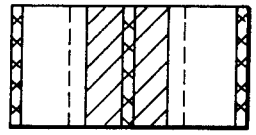
Figure 8D:
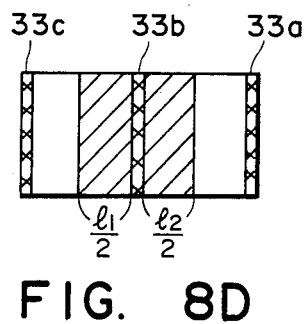

More specifically, for pulse voltage of $-2V$ (corresponding to FIG. 7A) and $-5V$ (corresponding to FIG. 7B), no change occurred from the bright state (corr. to FIG. 8A). For a pulse voltage of $-8V$ (corr. to FIG. 7C), a portion of the liquid crystal in the vicinity of the transmission electrode 33 is switched to the dark state 82 (corr. to FIG. 8B). Further, when the pulse voltage is changed to $-14V$ (corr. to FIG. 7D), the region of the dark state 82 is enlarged (corr. to FIG. 8C), and for a voltage pulse of 20V (corr. to FIG. 7E), the entirety of the pixel A is switched to the dark state (corr. to FIG. 8D). In this way, a gradational image may be formed.

Figure 9:
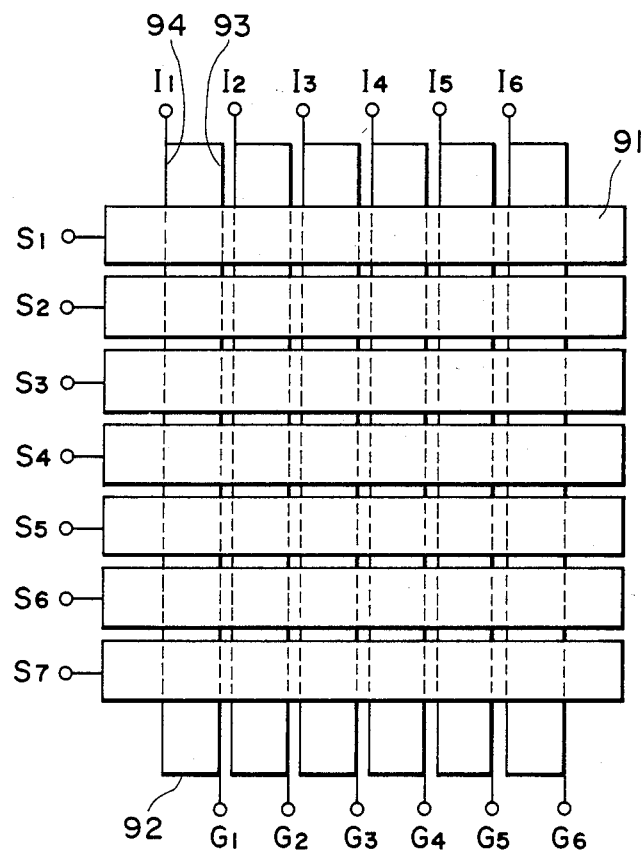
FIG. 9 is a plan view showing another embodiment of the present invention.

FIG. 9 is a plan view for illustrating an embodiment of the gradational display system applied to a matrix drive.

A liquid crystal optical device shown in FIG. 9 comprises a plurality of stripe electrodes 91 disposed on one substrate, and a plurality of high-resistivity stripe portions 92 disposed on the other substrate opposite to and intersecting with the stripe electrodes 91 with a ferroelectric liquid crystal disposed therebetween. Further, on both sides of each of the high-resistivity stripe portions 92 are disposed low-resistivity portions 93 and 94 as transmission electrode lines.

The liquid crystal optical device of FIG. 9 is driven in the following manner. A scanning signal pulse is sequentially applied to scanning lines $S_1$, $S_2$, $S_3$, . . . respectively formed by the stripe electrodes 91 and data signals are applied to data lines $I_1$, $I_2$, $I_3$, . . . respectively constituted by the low-resistivity portions 94 in phase with the scanning signal, whereby a picture of a gradational image can be formed. At this time, reference potential lines constituted by low-resistivity portions 93 are connected to, e.g., at 0 volt. Further, the data signals for the driving method may be pulse signals having a pulse duration, a number of pulses or a peak value depending on given gradation data. In this instance, pixels to be written are required to be uniformly brought to a display state based on one stable state of a ferroelectric liquid crystal.

According to the present invention, it is possible to effect a high speed writing into a display panel and also possible to effect a gradational display by using as input signals gradation signals modulated with respect to voltage, pulse duration, number of pulses, etc.

Further, according to the present invention, it has become possible to effect uniform alignment control over the entire surface of a ferroelectric liquid crystal device, whereby a perfect ON-OFF action of the liquid crystal becomes possible. As a result, a better looking display can be obtained compared with one obtained by using a ferroelectric liquid crystal device involving alignment defects due to a stepwise-difference on a substrate and also an apparently improved contrast can be attained.

Figure 10:
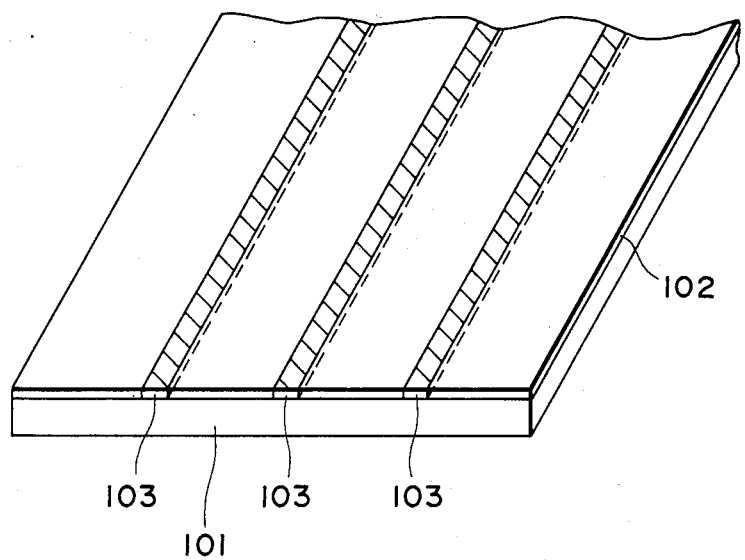
FIG. 10 is a perspective view of another substrate used in the present invention.
Figure 11A:
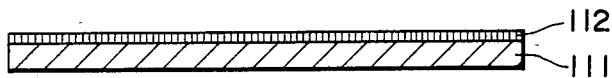
FIGS. 11A–11D are sectional views illustrating steps for preparing the substrate.
Figure 11B:
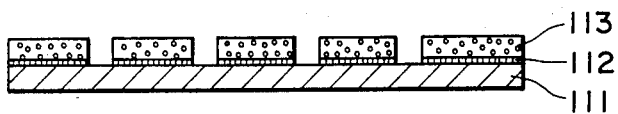
Figure 11C:
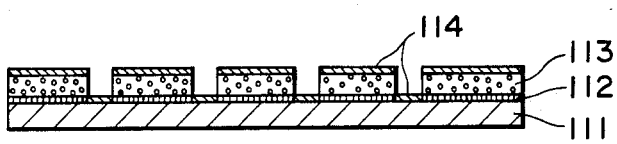
Figure 11D:
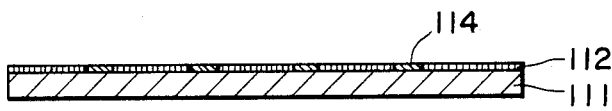
Figure 12:
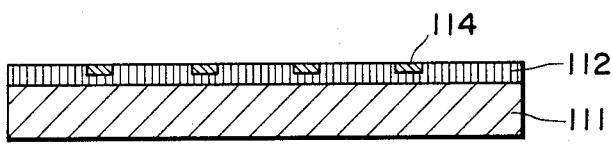
FIG. 12 is a sectional view of another substrate used in the present invention.

FIGS. 10-12 illustrate an optical modulation device which comprises a first substrate having thereon a first conductor film, a second substrate having a second conductor film, a ferroelectric liquid crystal disposed between the first and second substrates and stripe transmission electrodes formed on at least one of the substrates, wherein the stripe transmission electrodes are formed in grooves formed in the conductor films.

FIG. 10 is a perspective view of a substrate constituting an embodiment of the ferroelectric liquid crystal device of the above mentioned type.

Referring to FIG. 10, a substrate 101 has thereon a conductor film 102 and transmission electrodes 103 which are embedded in rectangular grooves formed in the conductor film 102.

An embodiment of preparation of such a substrate will now be explained with reference to FIGS. 11A-11D.

First, a 1000 Å-thick film of $In_2O_3$ containing 10% $ZnO_2$ was formed on the entire surface of a glass substrate 111 by EB vapor deposition. Thereafter, the substrate was heated at 350° C. for 1 hour in an oxygen atmosphere to form a conductor film 112 (FIG. 11A). The sheet resistivity of the conductor film 112 at this time was 100 K$\Omega$/$\square$. Then, the conductor film 112 was coated with a positive photoresist 113 ("AZ-1370", mfd. by Hoechst A.G.). The photoresist, after being subjected to prebaking, was exposed through a stripe mask having a masking width of 230 $\mu$m and a pitch of 250 $\mu$m, followed by development and washing to provide a stripe pattern. Then, the portions of the conductor film 112 not covered with the resist was removed by etching with an etching liquid containing ferric chloride and hydrochloric acid (FIG. 11B). Thereafter, a metal film 114 forming transmission electrodes was formed by vapor deposition on the above glass substrate 111 in a thickness of 1000 Å (FIG. 11C), and then the photoresist 113 was peeled by using acetone together with the portions of the metal film 114 thereon (FIG. 11D). Incidentally, in order to remove the photoresist, another organic solvent such as alcohols (methanol, ethanol), DMF (N,N-dimethylformamide) and cellosolves, or a remover solution prescribed for the photoresist may also be used.

Through the above steps, a substrate free of stepwise differences in height between the conductor film and transmission electrodes can be obtained.

A pair of the thus obtained substrates were respectively coated with an about 500 Å-thick polyvinyl alcohol layer and treated by rubbing.

Then, the two substrates were disposed to face each other and affixed to each other with a spacing of about 1 $\mu$m to form a blank cell, into which a ferroelectric liquid crystal composition comprising predominantly p-n-octyloxybenzoic acid-p'-(2-methylbutyloxy)phenyl ester and p-n-nonyloxybenzoic acid-p'-(2-methylbutyloxy)phenyl ester was injected to obtain a liquid crystal cell.

Further, lead wires were connected to edges of the substrate and pulse voltages were applied to the respective pixels for driving, whereby the respective pixels were inverted uniformly at a constant voltage and a good gradational display could be effected.

In the above embodiment, transmission electrodes were formed after the conductor film 112 was completely removed from the required portions as shown in FIG. 11D. However, the continuity between the conductor film and the transmission electrodes may be further ensured by removing the conductor film 112 partially or not completely at the required portions and then forming the transmission electrodes as shown in FIG. 12.

As described hereinabove, according to the present invention, alignment defects of a liquid crystal are obviated to provide a uniform alignment of monodomain over the entire area of a device. As a result, a perfect ON-OFF action of the liquid crystal has become possible, and a better looking display can be obtained compared with one obtained by using a device involving alignment defects. Further, an apparently improved contrast can be obtained.

Figure 13:
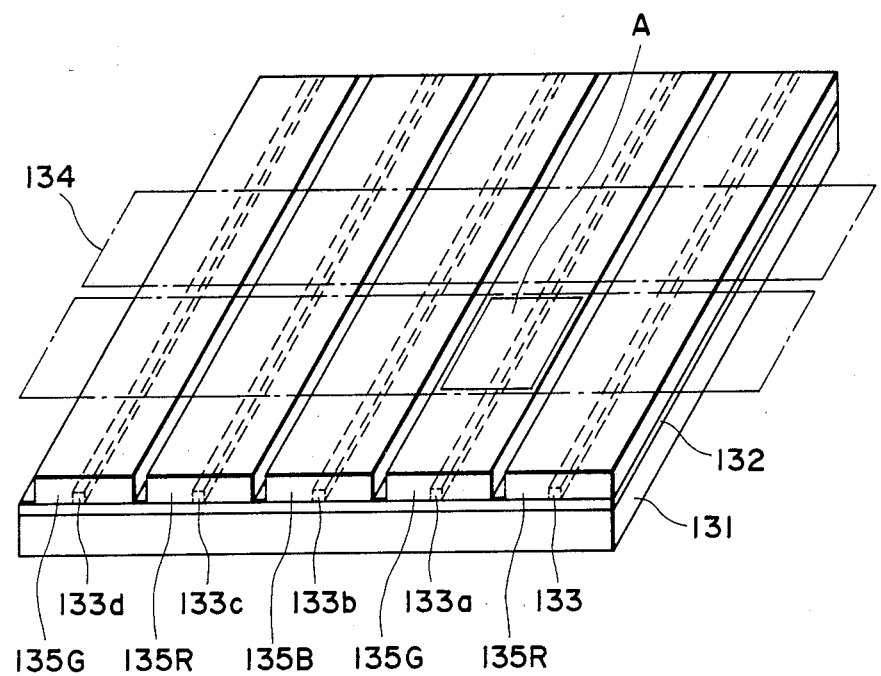
FIG. 13 is a perspective view of another substrate used in the present invention.
Figure 14:
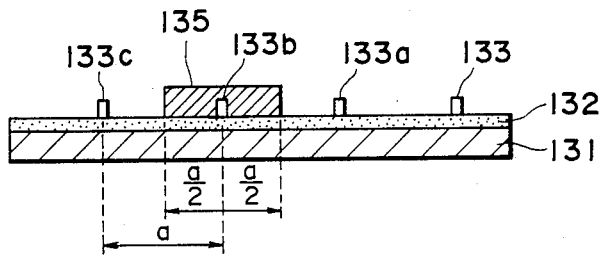
FIG. 14 is a sectional view showing a state wherein a color filter unit of only one color is formed in addition to a conductor film and transmission electrodes on a substrate.

FIGS. 13 and 14 show still another preferred embodiment of the present invention. More specifically, FIGS. 13 and 14 illustrate an optical modulation device which comprises: a first substrate having thereon a high-resistivity film with a sheet resistivity of $10^3$ $\Omega$/$\square$ or higher and a plurality of low-resistivity scanning electrode lines with a sheet resistivity of $10^2$ $\Omega$/$\square$ or below electrically connected to the high-resistivity film, a second substrate having thereon a plurality of data lines, an optical modulation material disposed between the first and second substrates, and at least one of the first and second substrates has thereon a pair of color filters (of the same or different colors, preferably of the same color) disposed on both sides of at least one of the scanning electrode lines. The pair of color filters may be disposed separately, but may also be formed as an integral film overlapping the scanning electrode line concerned and having two halves extending toward both sides of the scanning electrode line concerned as specifically shown in FIG. 13.

Referring to FIG. 13, a substrate 131 on one side has thereon a display conductor film 132 formed of a high-resistivity film having a sheet resistivity of $10^3$ $\Omega$/$\square$ or above, and further thereon a plurality of transmission electrodes each formed of a low-resistivity film of, e.g., a metal, having a sheet resistivity of $10^2$ $\Omega$/$\square$ or below. The transmission electrodes are disposed on the display conductor film 132 in parallel with each other at equal spacings. Further thereon, color filters of red (R), green (G) and blue (B), respectively, are formed so as to be along each transmission electrode at the center and with equal widths of almost a half of the arrangement pitch of the transmission electrodes on the left and right sides of the transmission electrode. These color filters may be formed by dyeing, electrolysis, vapor deposition of organic colorant, etc.

Opposite the substrate 131, the other substrate (not shown) is disposed to have thereon counter transparent stripe electrodes or a combination of a conductor film and transmission electrodes similar to those on the substrate 131 disposed to define pixels including one denoted by A in FIG. 13.

In a preferred embodiment, a 1000 Å-thick film of $In_2O_3$ containing 10% of $ZnO_2$ was formed on a glass substrate 131 by EB vapor deposition. Thereafter, the substrate was heated at 350° C. for 60 minutes in an oxygen atmosphere to form a display conductor film 132. The sheet resistivity of the conductor film at this time was 100 $K\Omega/\square$. Then, Al was vapor-deposited under vacuum through a mask on the conductor film to form transmission electrodes 133 in a thickness of 1000 Å and a width of 20 μm at a spacing of 230 μm. Instead, such transmission electrodes may be formed by vapor deposition of a uniform film of Al, followed by patterning thereof.

FIG. 14 shows a sectional view of the above prepared substrate. When transmission electrodes were arranged at a spacing of a, the color filters 135 of red (R), green (G) and blue (B) were formed so that they covered a transmission electrode at the center to leave an equal width of a/2 each on the left and right sides by vapor deposition and lifting-off of organic pigments.

On the other hand, on the counter substrate, an ITO layer covering regions A (pixel A) was formed to provide counter electrodes 134.

The thus prepared two substrates were respectively coated with a polyvinyl alcohol and subjected to rubbing. Then, the two substrates were disposed to face each other and fixed each other with a gap therebetween of about 1 μm to form a blank cell, into which a ferroelectric liquid crystal DOBAMBC heated to an isotropic phase was injected and sealed. The cell temperature was gradually cooled to prepare a liquid crystal device with a monodomain.

The transmission electrodes 133 may be formed of a metal such as silver, copper, gold, or chromium, or an alloy containing these metal elements instead of aluminum (Al) used in the above embodiment and may preferably be formed to have a sheet resistivity of $10^2$ $\Omega/\square$ or below. Further, the conductor film 132 to be provided with a potential gradient may be formed as a transparent conductor film having a sheet resistivity of $10^3$ $\Omega/\square$ or above, preferably 10 $K\Omega/\square$-1 $M\Omega/\square$. The sheet resistivity may be adjusted to an appropriate value by controlling the thickness of the transparent conductor film.

According to the present invention as described, a full color liquid crystal display apparatus of a large area and a high density may be prepared easily and at a low production cost.

In the present invention, a twisted nematic liquid crystal, a guest-host liquid crystal, etc., can be used instead of a ferroelectric liquid crystal as described above, but most preferably a ferroelectric liquid crystal, particularly one having at least two stable states, may suitably be used.

What is claimed is:

1. An optical modulation device, comprising:
   a first substrate having thereon a first conductor film;
   a second substrate having thereon a second conductor film; and
   an optical modulation material disposed between said first and second substrates,
   wherein at least one of said first and second conductor films has thereon a plurality of low-resistivity transmission electrode lines in electrical contact with said at least one of said first and second conductor films so as to provide a potential gradient along said at least one of said first and second conductor films and intersecting the low-resistivity transmission electrode lines,
   wherein at least one of said first and second substrates has thereon a color filter disposed on both sides of at least one of said low-resistivity transmission electrode lines.

2. An optical modulation device according to claim 1, wherein said color filter extends symmetrically on both sizes of at least one low-resistivity transmission electrode line.

3. An optical modulation device according to claim 1, wherein color filters of plural colors are disposed between two of the low-resistivity transmission electrode lines.

4. An optical modulation device according to claim 1, further comprising another color filter, wherein said two color filters are of two different colors and each color filter has a width substantially equal to one half of the distance between an adjacent pair of low-resistivity transmission electrode lines, and wherein said two color filters are disposed between said pair of adjacent low resistivity transmission electrode.

5. An optical modulation device according to claim 1, wherein said plurality of low-resistivity transmission electrode lines are in electrical contact with said first conductor film, and wherein said second conductor film is disposed in a plurality of stripes each serving as an electrode and intersecting said plurality of low-resistivity transmission electrode lines.

6. An optical modulating device according to claim 1, wherein each of said first and second conductor films has a plurality of low-resistivity transmission electrode lines in electrical contact therewith.

7. An optical modulation device according to claim 1, wherein said color filter comprises a blue, green or red color filter.

8. An optical modulation device according to claim 1, wherein said optical modulation material is a ferroelectric liquid crystal.

9. An optical modulation device according to claim 8, wherein said ferroelectric d is a chiral smectic liquid crystal.

10. An optical modulation device according to claim 9, wherein said chiral smectic liquid crystal is disposed in a layer sufficiently thin to release its helical structure.

11. An optical modulation device, comprising:
    a first substrate having thereon a high-resistivity film having a sheet resistivity of at least $10^3$ $\frac{1}{2}/\square$ and a plurality of scanning electrode lines having a sheet resistivity of no more than $10^2$ $\frac{1}{2}/\square$ and disposed in electrical contact with said high-resistivity film;
    a second substrate having thereon a plurality of data electrodes; and
    an optical modulation material disposed between said first and second substrates,
    wherein at least one of the first and second substrates having thereon a color filter disposed so as to extend on both sides of at least one of the scanning electrode lines.

12. An optical modulation device according to claim 11, wherein said color filter is disposed on said first substrate.

13. An optical modulation device according to claim 11, wherein color filter comprises a blue, green or red color filter.

14. An optical modulation device according to claim 11, wherein said optical modulation material is a ferroelectric liquid crystal.

15. An optical modulation device according to claim 14, wherein said ferroelectric liquid crystal is a chiral smectic liquid crystal.

16. An optical modulation device according to claim 15, wherein said chiral smectic liquid crystal is disposed in a layer sufficiently thin to release its helical structure.

17. An optical modulation device according to claim 11, wherein said color filter extends symmetrically on both sides of at least one of said scanning electrode lines.

18. An optical modulation device according to claim 11, wherein said scanning electrode lines are formed of metal.

19. An optical modulation device according to claim 18, wherein said metal is composed of a material selected from the group consisting of silver, copper, gold, chromium, and alloys containing at least one of said silver, copper, gold, and chromium.

20. An optical modulation device according to claim 11, wherein said high-resistivity film comprises predominantly $In_2O_3$ and $ZnO_2$.

21. An optical modulation device, comprising:
a first substrate having thereon a first conductor film;
a second substrate having thereon a second conductor film; and
an optical modulation material disposed between said first and second substrates,
wherein at least one of said first and second conductor films has a low-resistivity portion having a sheet resistivity of no more than $10^2$ $\Omega/\square$ and a high-resistivity portion having a sheet resistivity of at least $10^3$ $\Omega/\square$ and disposed in electrical contact with said low resistivity portion.

22. An optical modulation device according to claim 21, wherein said low-resistivity portion and said high-resistivity portion are formed alternately in stripe forms.

23. An optical modulation device according to claim 21, wherein said low-resistivity portion is formed through diffusion.

24. An optical modulation device according to claim 21, wherein said low-resistivity portion is formed in a stripe form by forming a stripe of a metal film on said conductor film and causing the metal to diffuse into said conductor film.

25. An optical modulation device according to claim 21, wherein said optical modulation material is a ferroelectric liquid crystal.

26. An optical modulation device according to claim 25, wherein said ferroelectric liquid crystal is a chiral smectic liquid crystal.

27. An optical modulation device according to claim 21, wherein said high-resistivity portion is formed to define a pixel, and a potential gradient is formed along said high-resistivity portion at the time of writing in the pixel.

28. An optical modulation device according to claim 21, wherein the difference in height between said high-resistivity portion and said low-resistivity portion is no more than 800 Å.

29. An optical modulation device according to claim 21, wherein the difference in height between said high resistivity portion and said low-resistivity portion is no more than 500 Å.

30. An optical modulation device, comprising:
a first substance having thereon a first conductor film;
a second substrate having thereon a second conductor film; and
an optical modulation material disposed between said first and second substrates,
at least one of said first and second conductor films being provided with a plurality of grooves in which stripe transmission electrodes are positioned.

31. An optical modulation device according to claim 30, wherein the depth of the grooves and the height of the stripe transmission electrodes are the same.

32. An optical modulation device according to claim 30, wherein the depth of the grooves is smaller than the height of the stripe transmission electrodes.

33. An optical modulation device according to claim 30, wherein said optical modulation material is a liquid crystal.

34. An optical modulation device according to claim 33, wherein said liquid crystal is a ferroelectric liquid crystal.

35. An optical modulation device according to claim 34, wherein said ferroelectric liquid crystal is a chiral smectic liquid crysta.

36. An optical modulation device according to claim 34, wherein said ferroelectric liquid crystal is a chiral smectic liquid crystal having a non-helical structure.

37. An optical modulation device according to claim 21, wherein the difference in film thickness between the said low-resistivity portion and the said high-resistivity portion is no more than 1000 Å or less.

38. An optical modulation device according to claim 1, wherein one of said low-resistivity transmission electrode lines is on said first conductor film, and wherein said color filter is on said second substrate.

* * * * *

UNITED STATES PATENT AND TRADEMARK OFFICE
CERTIFICATE OF CORRECTION

PATENT NO. : 4,802,744
DATED : February 7, 1989
INVENTOR(S) : HITOSHI SHINDO, ET AL.    Page 1 of 2

It is certified that error appears in the above-identified patent and that said Letters Patent is hereby corrected as shown below:

COLUMN 2

Lines 24-25, "BRIEF DESCRIPTION OF THE DRAWINGS" should be centered as a heading.

COLUMN 4

Line 61, "the prepared" should read --the thus prepared--.

COLUMN 10

Line 23, "electrode" should read --electrode lines--.
    Line 43, "ferroelectric d" should read --ferroelectric liquid crystal--.
    Line 51, "$10^3 \Omega/\Box$ " should read --$10^3 \Omega/\Box$ --.
    Line 53, "$10^2 \Omega/\Box$ " should read --$10^2 \Omega/\Box$ --.

COLUMN 11

Line 38, "low resistivity" should read --low-resistivity--.

UNITED STATES PATENT AND TRADEMARK OFFICE
CERTIFICATE OF CORRECTION

PATENT NO. : 4,802,744

DATED : February 7, 1989

INVENTOR(S) : HITOSHI SHINDO, ET AL.

It is certified that error appears in the above-identified patent and that said Letters Patent is hereby corrected as shown below:

COLUMN 12

Line 14, "high" should read --high- --.
    Line 18, "first substance" should read --first substrate--.
    Line 41, "crysta." should read --crystal--.

Signed and Sealed this

Twenty-first Day of November, 1989

Attest:

JEFFREY M. SAMUELS

*Attesting Officer*    *Acting Commissioner of Patents and Trademarks*